United States Patent [19]

Twerdochlib

[11] Patent Number: 4,676,665
[45] Date of Patent: Jun. 30, 1987

[54] DISTRIBUTED TEMPERATURE SENSOR APPARATUS

[75] Inventor: Michael Twerdochlib, Oviedo, Fla.

[73] Assignee: Westinghouse Electric Corp., Pittsburgh, Pa.

[21] Appl. No.: 864,670

[22] Filed: May 19, 1986

[51] Int. Cl.$^4$ .................... G01K 1/12; G01N 29/00
[52] U.S. Cl. ........................... 374/152; 364/557; 374/6; 374/117
[58] Field of Search ............ 374/6, 5, 117, 152; 361/25, 37

[56] References Cited

U.S. PATENT DOCUMENTS

| | | | |
|---|---|---|---|
| 4,232,551 | 11/1980 | Pierce | 374/152 X |
| 4,471,474 | 9/1984 | Fields | 73/655 X |
| 4,623,264 | 11/1986 | Mitchell | 374/117 |

*Primary Examiner*—Daniel M. Yasich
*Attorney, Agent, or Firm*—D. Schron

[57] ABSTRACT

A liquid-filled tube placed next to a generator winding section provides an indication of an abnormal hot spot which may develop along the winding. The tube is filled with a liquid which vaporizes to form a vapor bubble at the hot spot location. Acoustic energy is projected through the liquid in the tube and is normally received at the distal end of the tube. Presence of a vapor bubble blocks the acoustic propagation and forms a reflective surface for the acoustic energy which then is utilized to calculate distance to the vapor bubble. With a known pressure versus temperature relationship, the pressure of the liquid is controlled such that the hot spot temperature may be determined.

14 Claims, 5 Drawing Figures

DISTRIBUTED TEMPERATURE SENSOR APPARATUS

BACKGROUND OF THE INVENTION

1. Field of the Invention

The invention in general relates to temperature sensors, and particularly to apparatus which includes an elongated sensor for placement against a device to be monitored, the apparatus being capable of determining an abnormal hot spot at any point along the elongated sensor.

2. Description of the Prior Art

In the field of diagnostics, various sensors are generally provided to monitor different predetermined parameters of an operating on-line system. A common measurement for a typical system may include one or more temperature readings which are monitored to see that they do not exceed predetermined values, dependent upon the operating system.

A typical temperature sensor may include a small thermistor or thermocouple which provides an electrical output signal proportional to the measured temperature. Some systems, however, preclude the use of such sensors in view of the extremely hostile electrical environment to which they are subjected. By way of example, modern electric generators such as those driven by steam turbines have the capacity to carry several thousand amperes of current in their stator windings. In view of the extremely high and varying magnetic fields caused by this current, as well as voltages measurable in the tens of kilovolt range, temperature sensors having long electrical output leads cannot be placed directly on the windings. Sensors are generally located at some distance from the windings so as to obtain a temperature reading by secondary measurements of the cooling water or cooling gas normally passed through such windings.

Under certain circumstances, due to the distant placement of the sensors and the indirect temperature measurement, a severe condition may already exist before detection is possible. Due to some abnormal operating condition, a hot spot may be generated in the winding, raising the localized temperature to an abnormal value. Although the hot spot will cause a temperature rise in the cooling medium, the rise in temperature as presently detected may vary as a function of the location of the hot spot.

The present invention obviates the indirect method of temperature sensing and will immediately give an indication of an abnormal hot spot. Further, the apparatus can be constructed and arranged to give the location of the hot spot as well as its temperature.

SUMMARY OF THE INVENTION

The apparatus of the present invention includes a liquid-filled tube having first and second ends and adapted to be positioned on or next to a device to be monitored for temperature. The liquid is of the type which forms a vapor bubble at a position opposite a hot spot of the device if the temperature at the position due to the hot spot exceeds a predetermined value, dependent upon the pressure that the liquid experiences.

A transducer means is connected to the first end of the tube and is operable to project acoustic energy toward the second end through the liquid, the second end being suitably terminated. Control means are provided for determining if the acoustic energy propagated into the tube does not reach the second end due to blockage of the acoustic path by a vapor bubble, in which case the existence of a hot spot is verified.

To obtain the exact location of the vapor bubble, means are provided for determining the time of flight of a projected acoustic signal from the transducer means back to the transducer means after reflection off of the vapor bubble. Knowing the speed of sound in the liquid medium, the distance to the bubble may then be calculated.

Since the temperature at which the vapor bubble forms is a function of the liquid pressure, means may additionally be provided for adjusting the pressure so that the actual temperature of the hot spot may be determined.

BRIEF DESCRIPTION OF THE PREFERRED EMBODIMENT

Figure 1:
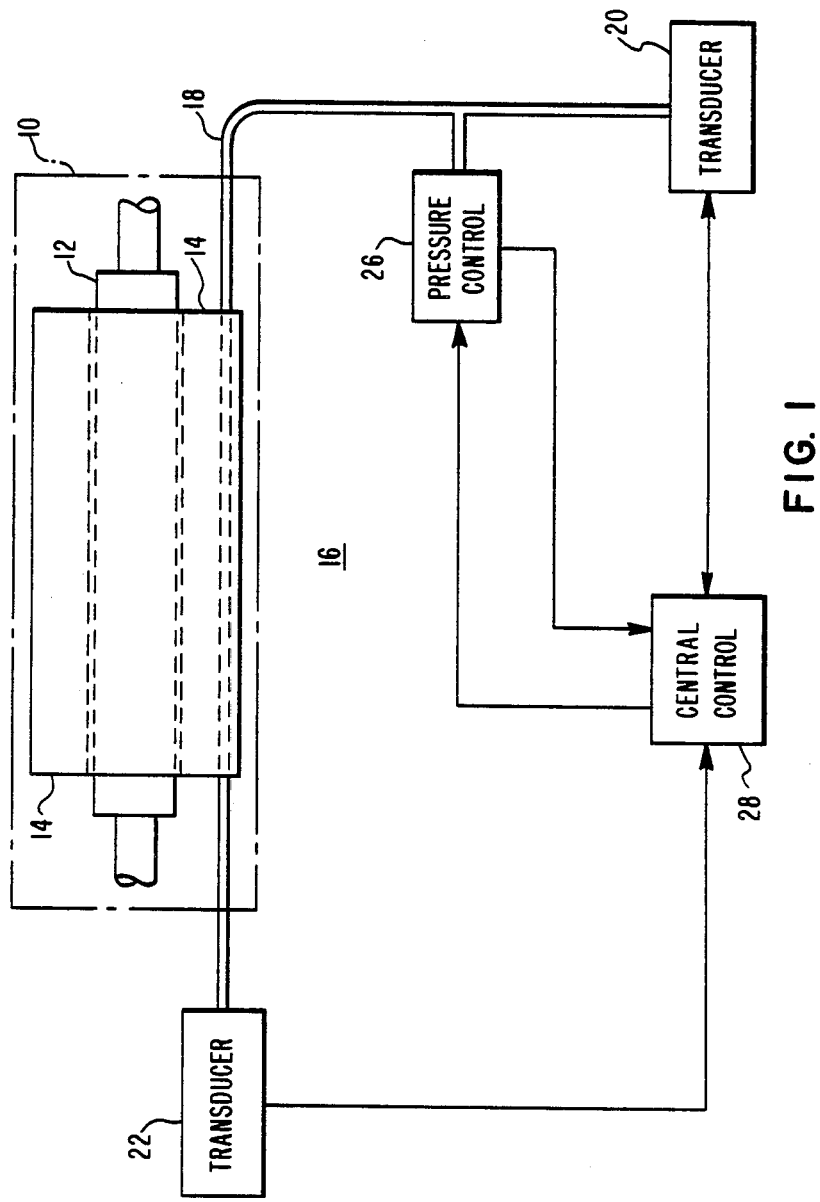
FIG. 1 is a simplified block diagram illustrating the temperature measurement of a generator stator winding.

Although the apparatus is applicable for determining hot spots along a line associated with a variety of devices, it will be described by way of example with respect to the determination of hot spots along an electrical generator stator winding, such as illustrated in FIG. 1.

In simplified form, the generator 10 includes a rotor 12 which is surrounded by a stator 14 having a plurality of slots for receiving the stator windings, or coils. Distributed temperature sensing apparatus 16 includes a liquid-filled, small diameter tube 18 which, within the generator housing, is placed proximate the stator winding.

The apparatus includes a transducer 20 at one end of tube 18 and operable to project acoustic energy through the fluid in the tube which includes a termination at its opposite end, which termination in one embodiment includes an additional transducer 22. Pressure control apparatus 26 is operable to vary the pressure of the liquid in tube 18 and operation of the pressure control 26 as well as the transducers is governed by a central control means 28.

Figure 2A:
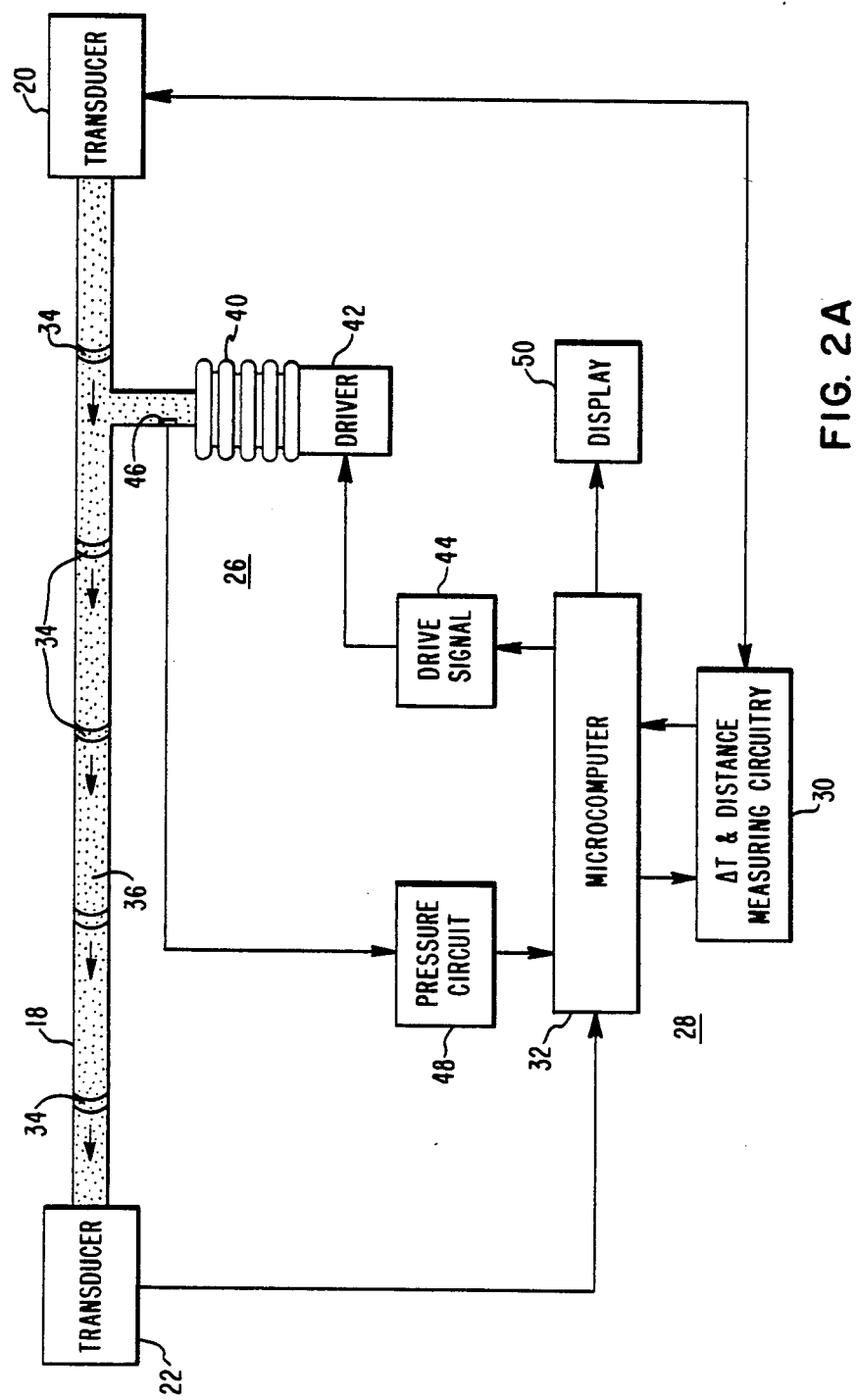
FIGS. 2A and 2B are block diagrams illustrating the operation of the apparatus prior and subsequent to the formation of a vapor bubble.
Figure 2B:
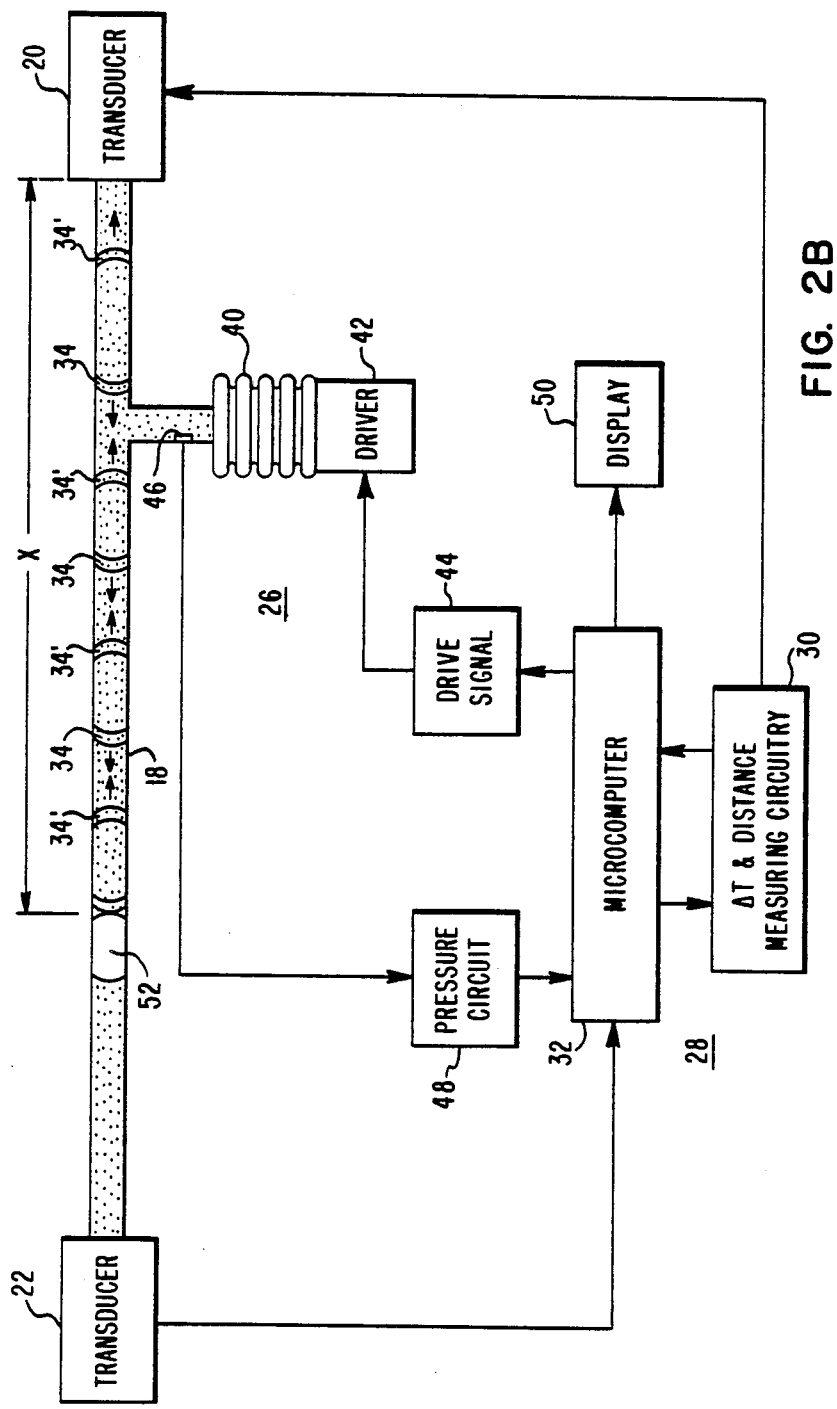

FIGS. 2A and 2B illustrate the apparatus of FIG. 1 in somewhat more detail. For convenience, the generator is not shown and tube 18 is illustrated as lying along a straight line between the two transducers. The central control means 28 includes a time difference and distance measuring circuit 30 under control of a microcomputer 32 and operable in a well-known manner to cause transducer 20 to project an acoustic pulse 34 into the liquid 36 of tube 18. A time difference, or $\Delta T$ counter, starts counting when the acoustic pulse is projected and times out after a certain time period, whereupon reception of the acoustic pulse by transducer 22 provides an output signal indicative of this fact to the microcomputer 32. The process is repeated until a hot spot occurs, causing a formation of a vapor bubble in the tube 18, as will be explained.

The pressure control arrangement 26 includes, by way of example, a flexible bellows 40 which may be moved by a driver 42 in response to a drive signal from circuit 44 derived from microcomputer 32. Such driver 42 may be, for example, a solenoid arrangement or a hydraulic-driven piston. The pressure of the liquid 36 is communicated to microcomputer 32 by the provision of a pressure sensor 46 and pressure circuit 48.

A utilization means such as a display 50 is provided in order to communicate to an operator and/or to a diagnostic computer, information relative to the operation of the apparatus.

Suppose now that the generator winding develops an abnormal hot spot of a temperature sufficiently high to cause local vaporization of the fluid 36 resulting in a vapor bubble 52 within tube 18 located at some distance X from transducer 20. The vapor bubble presents an extreme acoustic impedance difference between it and the liquid and accordingly serves to reflect the projected acoustic pulse 34. The reflected pulse, indicated by numeral 34' travels back toward transducer 20 and when received causes transducer 20 to provide an output signal to stop the running of the ΔT timer of circuitry 30. Thus, having established the round trip time of flight of the acoustic pulse, the distance X may be calculated from the basic equation $X = VT$ where V represents known speed of sound in the liquid and T represents the time indicated by the ΔT counter, in which case the resulting product would be halved to account for the round trip travel. Additional confirmation of the existence of the vapor bubble 52 is the fact that transducer 22 no longer will provide an output signal to microcomputer 32 since the passage of acoustic pulse 34 within tube 18 is blocked by the vapor bubble.

Having thus established the existence of a hot spot as well as its location, the apparatus may additionally be operable to determine, to a good approximation, the temperature of the hot spot. This determination is accomplished by operation of the pressure control arrangement 26.

The temperature at which the fluid within tube 18 changes from a liquid to a gas at a localized hot spot is a function of the pressure of the liquid. The greater the liquid pressure the higher will be the temperature necessary to cause vaporization. Accordingly, in one embodiment of the operation of pressure control 26, once the existence of a vapor bubble 52 has been established, and a distance thereto measured, the pressure of the liquid may be increased by an appropriate signal to driver 42 from drive circuit 44 to compress bellows 40, and accordingly place liquid 36 under greater pressure. The actual pressure, communicated by pressure sensor 46 is slowly increased up to a point where vapor bubble 52 disappears. Upon disappearance the acoustic path through the liquid to transducer 22 is once again completed. Provision of an output signal by transducer 22 signals microcomputer 32 to terminate the pressure sweep by drive 44. The microcomputer 32 can then determine from a simple look-up table the corresponding temperature for the particular pressure at which the vapor bubble reverted back to its liquid state.

Alternatively, the pressure control section 26 may be operated in repetitive sweep cycles starting at a higher pressure and ending at a lower pressure, with the sweep corresponding to the expected temperature range at which hot spots would occur. In the absence of a hot spot the apparatus would continue in its repetitive sweeps. In the presence of a hot spot and a corresponding vapor bubble, the exact pressure at which the bubble occurred would be known, the corresponding temperature would be computed, and the distance to the bubble would be calculated as previously described.

Figure 3:
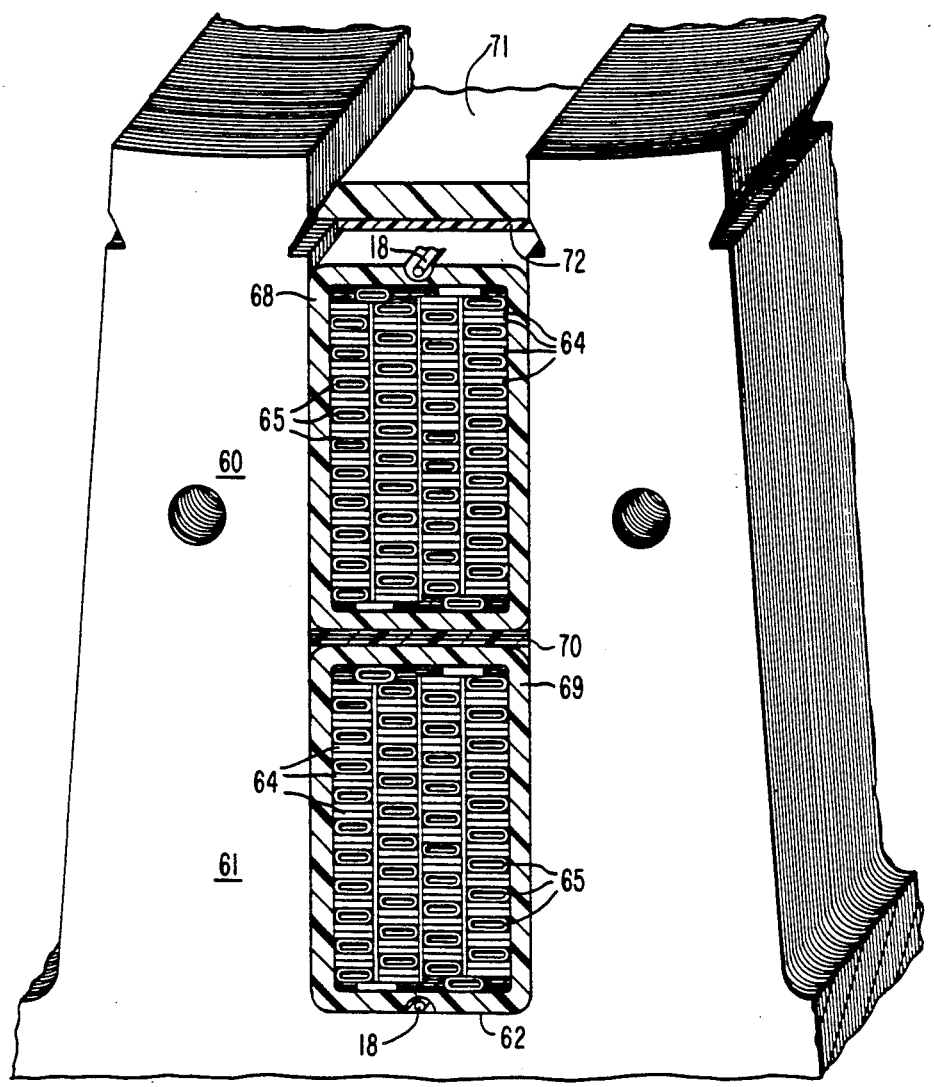
FIG. 3 is a sectional view illustrating two half coils of a generator arranged in a slot of the stator of the generator and further illustrating the placement of the sensor means.

FIG. 3 illustrates two coil sections 60 and 61 positioned one above the other in a slot 62 of the stator structure. The coil sections are typical of the water-cooled variety and include a plurality of insulated electrical conductors called "strands," some of which are solid as indicated by numeral 64 and others of which are hollow as indicated by numeral 65, with the hollow strands being utilized for conduction of the cooling water throughout the length of the stator core.

The strands of each coil section are additionally surrounded by respective insulating layers 68, 69 separated by a spacing member 70 with the windings being held in position by means of a wedge 71 and ripple spring 72.

In one embodiment the tube 18 of the distributed temperature sensor apparatus could be located very close to the electrical conductors by positioning the tube in the insulation layer 68 for coil section 60, as illustrated by the broken-away portion, and in insulation layer 69 for coil section 61.

Figure 4:
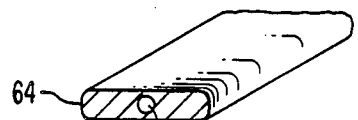
FIG. 4 illustrates an alternate placement.

As an alternative, and as illustrated in FIG. 4, a portion of the fluid-carrying tube could be incorporated in one of the electrical strands 64 having a central aperture 76 throughout the length thereof to accommodate the vaporizable liquid. Suitable connections on the ends of the selected strand could then couple with the remainder of the tube for proper operation. Consideration could also be given to placing the tube within one of the water-carrying hollow strands 65.

The apparatus depicted in FIG. 1 functions to obtain an indication of an abnormal hot spot in a generator coil section next to which tube 18 is placed. The plurality of such coil sections could be monitored by extending the length of tube 18 to a degree where it can be placed adjacent a plurality of such coil sections such that an acoustic pulse would traverse the additional coil sections before being received by transducer 22. In addition, a plurality of such systems could be provided so that all of the coil sections in the generator could be monitored, if desired.

If more than one coil section should develop a hot spot or if more than one hot spot should develop in one coil section, and if the hot spots are caused by different temperatures, the apparatus will initially determine the distance to, and temperature of, the vapor bubble closest to the transmitting transducer 20 and, depending upon the relative temperatures involved, may obtain the data on the remaining hot spots after conversion of the acoustically blocking vapor bubble back to its liquid state.

For some applications it may be sufficient for a user to just know that a hot spot has occurred, without the requirement for distance or temperature data. In such instance, the distance measuring and pressure control arrangements need not be provided. Either a loss of acoustic signal from transducer 22 could be used to signal that a vapor bubble has appeared in the acoustic path, or if tube 18 is terminated by an acoustic absorber, a reflected signal picked up by transducer 20 would be indicative of the bubble formation.

I claim:

1. Distributed temperature sensor apparatus, comprising:
   (A) a liquid filled tube having first and second ends and adapted to be positioned proximate a device to be monitored for temperature;
   (B) liquid in said liquid filled tube being convertible to a vapor bubble at a position opposite a hot spot of said device, if the temperature of said position due to said hot spot exceeds a predetermined value dependent upon the pressure of said liquid;
   (C) transducer means connected to said first end of said tube and operable to project acoustic energy toward said second end, through said liquid;
   (D) means for receiving said projected acoustic energy terminating said second end of said tube; and
   (E) means for determining if said acoustic energy projected into said tube does not reach said second end, due to blockage of the acoustic path by said vapor bubble.

2. Apparatus according to claim 1 wherein:
   (A) said terminating means is a transducer operable to provide an output signal upon receipt of said acoustic energy projected through said liquid.

3. Apparatus according to claim 2 wherein:
   (A) said determining means utilizes said transducer output signal to confirm the absence of said vapor bubble.

4. Apparatus according to claim 1 wherein said determining means includes:
   (A) circuitry for calculating the distance to said vapor bubble from a reference.

5. Apparatus according to claim 4 which includes:
   (A) circuit means for determining the time of flight of an acoustic pulse projected from said transducer means to said vapor bubble and back to said transducer means.

6. Apparatus according to claim 5 which includes:
   (a) circuit means for calculating said distance in response to said time of flight, and the speed of sound in said liquid.

7. Apparatus according to claim 1 which includes:
   (A) means for varying the pressure of said liquid.

8. Apparatus according to claim 7 which includes:
   (A) means for sensing the pressure of said liquid and providing an output pressure signal indicative thereof.

9. Apparatus according to claim 7 wherein:
   (A) said means for varying increases said pressure upon the occurrence of said vapor bubble until a point where said vapor bubble is converted back to a liquid state.

10. Apparatus according to claim 9 wherein:
    (A) said determining means is responsive to said output pressure signal at said conversion of said vapor bubble, to provide an indication of said temperature at said position of said vapor bubble.

11. Apparatus according to claim 7 wherein:
    (A) said means for varying repetitively sweeps the pressure of said liquid from a high pressure value to a lower pressure value.

12. Apparatus according to claim 1 which includes:
    (A) an electrical generator having a plurality of electrically conductive coil sections;
    (B) said tube lying adjacent at least one of said coil sections.

13. Apparatus according to claim 12 wherein:
    (A) said coil sections each include a plurality of electrically conducting strands;
    (B) at least one of said strands having an aperture extending along the length of the strand:
    (C) said aperture forming a portion of said tube.

14. Apparatus according to claim 12 wherein:
    (A) said coil sections each include a plurality of electrically conducting strands;
    (B) a plurality of said strands being hollow for conduction of a cooling fluid;
    (C) said tube being positioned within one of said hollow strands.

* * * * *